United States Patent [19]

Ambler et al.

[11] 3,954,367

[45] May 4, 1976

[54] STACKING WHEELS WITH SUPERIMPOSED RETARDER ACTION

[75] Inventors: James R. Ambler, Seekonk, Mass.; Robert W. M. Hewitt, Bristol, R.I.

[73] Assignee: G. T. Schjeldahl Company, Northfield, Minn.

[22] Filed: Sept. 16, 1974

[21] Appl. No.: 506,257

[52] U.S. Cl. .................................. 425/289; 93/8 R; 93/93 R; 226/198; 271/69

[51] Int. Cl.$^2$ .......................................... B29C 17/14

[58] Field of Search .......... 425/DIG. 200, DIG. 201, 425/317, 383, 324 R, 369, 289; 228/4, 5, 6; 226/198; 271/273, 274, 188, 198, 202, 203, 182, 69, 80; 93/33 H, 93 HT, 84 R, 84 TW, 93 R; 156/361; 83/94

[56] References Cited

UNITED STATES PATENTS

| | | | |
|---|---|---|---|
| 2,947,345 | 8/1960 | Schjeldahl | 156/361 |
| 3,722,376 | 3/1973 | Wech | 93/93 R |

*Primary Examiner*—Francis S. Husar
*Assistant Examiner*—R. J. Charvat
*Attorney, Agent, or Firm*—Orrin M. Haugen

[57] ABSTRACT

A stacking system for thermoplastic film products, such as polyethylene bags or the like. The stacking system is arranged to be employed in combination with a product conveyor which receives finished articles or products from a thermoplastic film converting machine, the arrangement employing stacking wheels disposed along the terminal portion of the conveyor, and wherein the drive means for the stacking wheels are arranged to impart rotary motion to the stacking wheels in timed relationship to the movement of thermoplastic film product therethrough, and with means being provided to intermittently retard the rotational velocity of the stacking wheels at a point generally coincident with the passage of the trailing edge of the film product through the stacking wheels so as to frictionally retard the rate of speed of travel of the film product.

4 Claims, 7 Drawing Figures

STACKING WHEELS WITH SUPERIMPOSED RETARDER ACTION

BACKGROUND OF THE INVENTION

The present invention relates generally to an improved system for handling thermoplastic film products such as plastic bags or the like, and more particularly to an improved system for accommodating stacking or delivery of these devices from a converting machine or apparatus. Generally, thermoplastic film converting machines such as bag making machines employ a constant speed conveyor to receive products from the final working station of the converting machine, and the system of the present invention provides means for forming a stable air foil of the film product while controllably attenuating or retarding the rate of speed of these products as they are driven from the terminal end of the conveyor, whereupon they are normally stopped against a stacking gate.

The principal purpose of the stacking wheels or "corrugating wheels" as they are sometimes referred to, in an apparatus fabricating thermoplastic film products is to form the product into a more stable air foil, and thus permit high speed delivery of the product from the converting machine to a product receiving station such as a stacking gate. Normally, the stacking wheels or corrugating wheels provide a generally sinusoidal transverse profile to the film product as it moves therethrough, thus achieving a corrugated effect in the product, with the corrugations generally being along an axis parallel with the traveling axis of the web. In order to reduce the speed at which individual film products approach a stacking gate or barrier member, a rotating blade or paddle is frequently interposed along the path of travel, and the rotating blade strikes the film product and frictionally engages the product against a flat planar surface. Such activity, of course, destroys the corrugated effect in the product, and tends to reduce its effectiveness as an air foil.

In the fabrication of thermoplastic film products, such as bags or the like, the products are normally fabricated in the converting equipment on a continuous line basis wherein the individual operations conducted on the plastic film are carried out at one or more working stations. Thus, the converting machinery will normally be provided with a working surface, along with means for receiving a supply web of thermoplastic film to be moved therethrough, the movement normally being in the web direction of the machinery. After preparation of the products within the converting equipment, the individual thermoplastic film articles or products are transferred to a constant speed conveyor and from the conveyor, ultimately on to a product receiving area, normally a stacking gate. At the article receiving station, such as the stacking gate, the products are normally stacked in superimposed relationship, one upon another, until a specific predetermined number of articles are received.

The rate of production is normally limited by the rate of speed at which the material can be conveniently removed from the individual working stations. Thus, while the web of material may be moved at a reasonably controllable rate of speed, the limiting factor for production is normally determined by the rate at which the individual articles may be removed from the working stations. While a high speed conveyor is usable for removing the individual completed articles from the final working stations, ultimately these individual articles must be transferred on to a receiving station such as a stacking gate or stacking table. Inasmuch as these thermoplastic film products or articles have significant length and width dimensions, when they are moved at high rates of speed, these articles are subject to interference from air currents or ambient air, and thereby tend to lose whatever rigidity and stability that may be induced when undergoing transfer as an air foil from a conveyor to the product receiving station. Curling, folding, or other anomolies may be introduced into the article when ultimately transferred from the conveyor to the product receiving station. The present invention makes it possible to transfer the completed film products from the conveyor on to the stacking table at a high rate of speed and under stable and controllable conditions and as an air foil or projectile.

In the fabrication of thermoplastic film products from a continuous web, the individual finished articles are necessarily separated and transmitted in spaced relationship from the final working station. This is necessary in order to eliminate any danger of having fused portions of mutually adjacent articles becoming bonded to mutually adjacent distinct articles. Therefore, the highest rate of lineal speed in the overall converting machinery is normally found in the conveyor leading from the final treating station, this conveyor providing spacing between individual and sequential film products. Speeds in excess of 200 lineal feet per minute are common in conventional bag-making equipment.

While various techniques have been employed in order to increase the longitudinal rigidity and stability of film products as they leave or are discharged from the conveyor and enter the stacking area, the primary technique utilized is to pass the individual articles through corrugating wheels or the like wherein the longitudinally extending transversely corrugated configuration is introduced to the article. Thus, the individual articles may be transferred as air foils or projectiles on to the stacking gate. The stability of the product so transferred therefore depends on its ability to retain its corrugated configuration, and thus means for limiting the tendency of the product to revert to the planar configuration will enhance the transferability of the products. As indicated above, the present use of blades or paddles against the surface of the corrugated film product tends to disrupt the stabilizing configuration.

SUMMARY OF THE INVENTION

In accordance with the present invention, drive means are provided for the corrugating wheels which provide a rotational velocity in the corrugating wheels which functions in timed relationship to the movement of film products through these stacking or corrugating wheels. This drive means provides a normal rotational velocity or rate substantially equal to the forward motion of the conveyor means, with intermittent periods of either dwell or substantially retarded rates being interposed on the stacking wheels. These intermittent periods of retarded rate are timed so as to coincide with the passage of the trailing edge of the thermoplastic film product through the stacking wheels, thereby providing minimal disruption to the corrugated configuration of the product as it moves through the stacking wheels and on to the product receiving area or stacking gate.

In this condition, the mass of material which is behind the immediate point of contact between the stacking wheels and the film product is relatively small, so as to eliminate or reduce problems of preservation of longitudinal stability in the article or film product. Synchronization of the motion or action of the stacking wheels with the film products is achieved in any of a variety of manners, a number of which are described in detail hereinafter.

Therefore, it is a primary object of the present invention to provide improved stacking wheel drive means for use in combination with thermoplastic film converting equipment, such as bag-making machines, to assist in the delivery of finished film articles from a product conveyor on to a product receiving station such as a stacking gate.

It is a further object of the present invention to provide an improved drive arrangement for the stacking wheels of a bag-making machine, wherein intermittent periods of dwell or retarded motion are introduced to the stacking wheels, with these intermittent periods coinciding with the passage of the trailing edge of a film product through the stacking wheels so as to frictionally decelerate the film product.

It is yet a further object of the present invention to provide an improved speed attenuating means for thermoplastic film articles moving through stacking or corrugating wheels disposed between a high speed conveyor and a stacking gate wherein the corrugating wheels are provided with a drive means which introduces intermittent periods of retarded motion to these wheels in order to controllably discharge products from the stacking wheels in stable corrugated configuration and at reduced rates of speed.

Other and further objects of the present invention will become apparent to those skilled in the art upon a study of the following specification, appended claims, and accompanying drawings.

DESCRIPTION OF THE PREFERRED EMBODIMENT

Figure 1:
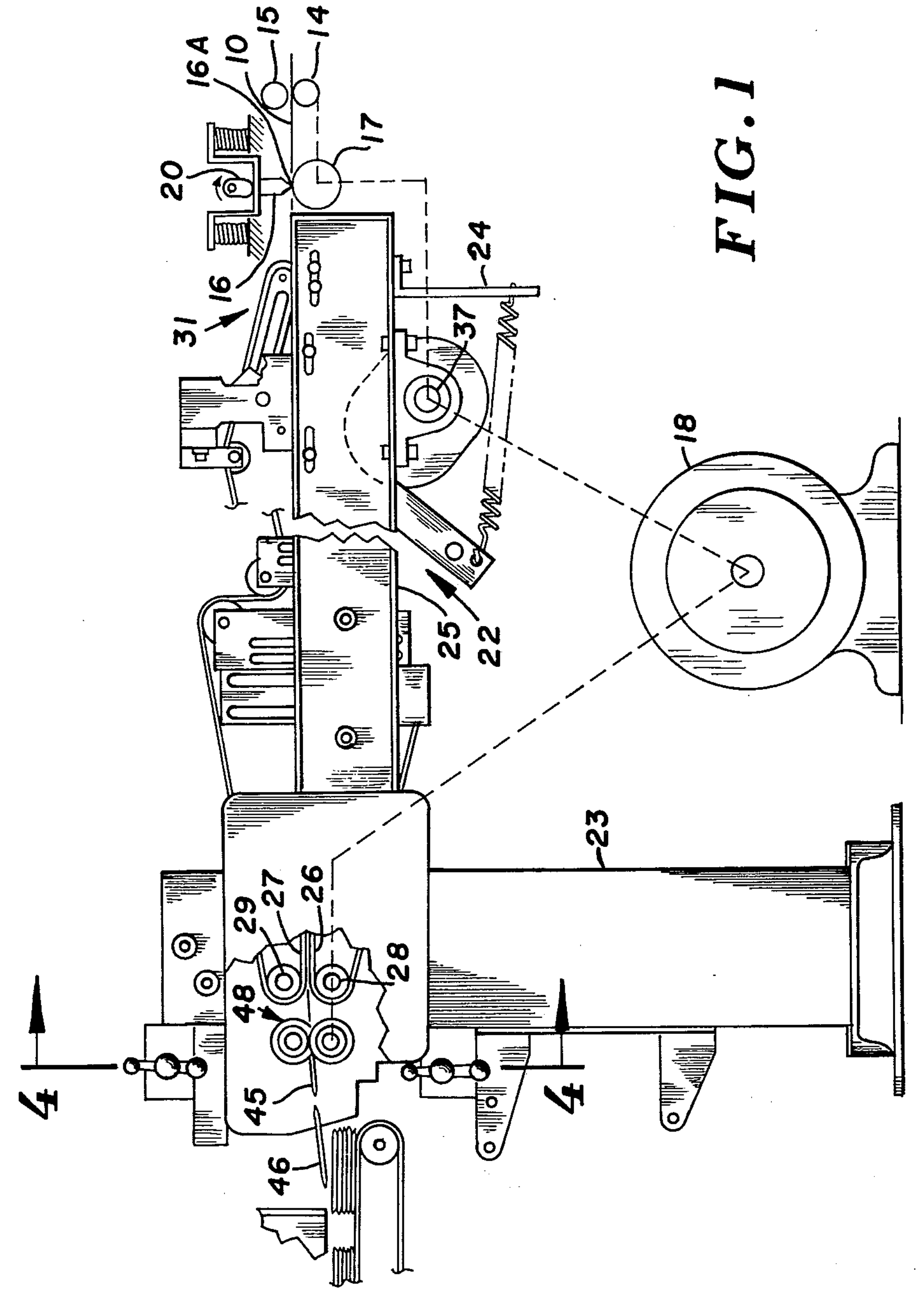
FIG. 1 is a side elevational view, partially broken away and partially in section, and showing a corrugating wheel speed attenuator station being provided at the terminal end of a film product conveyor, this view also showing a portion of the thermoplastic film converting mechanism or machinery.
Figure 7:
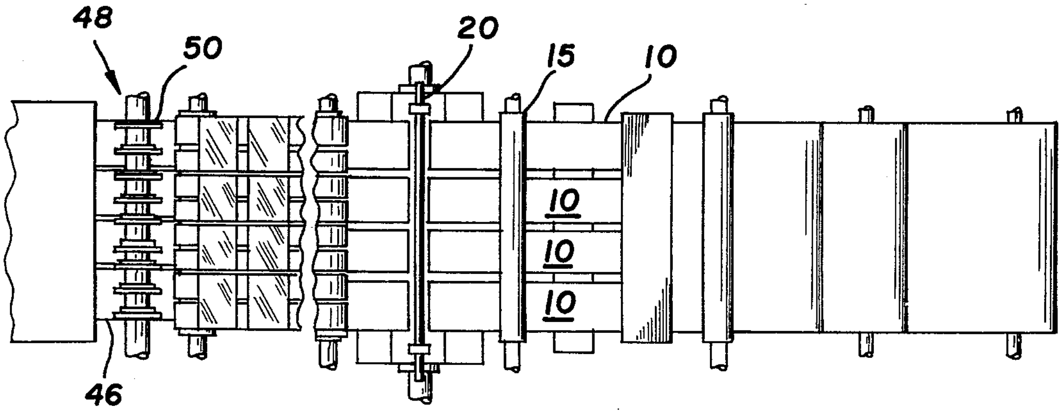
FIG. 7 is a diagrammatic view on a reduced scale, and showing various processing stages which are normally employed in thermoplastic film converting apparatus, and also illustrating the physical arrangement of the stacking or corrugating wheels of the present invention in combination with this converting apparatus.

In accordance with the preferred modification of the present invention, and with particular attention being directed to FIG. 1 of the drawings, the thermoplastic film article forming and treating means is illustrated as treating superimposed continuous films or webs of polyethylene or similar sheet material 10 which are being drawn from a pair of supply rolls 11 and 12, as illustrated in FIG. 7. It will be appreciated, of course, that a single web of thermoplastic tubing or folded film may be utilized in order to provide the plurality of superimposed webs normally employed in the fabrication of thermoplastic film or sheet articles. A pair of mating and cooperating draw rolls 14 and 15 are employed to draw the film from the supply rolls 11 and 12 and thereby across the working surface of the converting apparatus. The working surface of the apparatus may be defined generally as the plane through which the webs move, which plane is coincident with the nip of the draw rolls 14 and 15, and also the plane of the spacing between the sealing or welding bar 16 and its cooperating sealing roll 17.

The draw rolls are powered by the main power source or motor 18, and driven intermittently in accordance with the apparatus disclosed in U.S. Pat. No. 2,997,889, G. T. Schjeldahl, et al, entitled "Intermittent Engine", as well as that apparatus disclosed in U.S. Pat. No. 2,947,345, G. T. Schjeldahl, entitled "Machine for Making Articles from Multiple Thermoplastic Webs".

The thermoplastic film forming apparatus, which, in this instance, is forming flat bags from a continuous stock of polyethylene film, includes a thermal treating means such as the welding and sealing bar 16 which has a heating rod therein for providing a heated surface or tip as at 16A, which tip is adapted to make intermittent contact with sealing roll 17 while the web is interposed therebetween. Sealing bar 16 is driven by a cam lifting mechanism such as is shown at 20, it being understood, of course, that any of a variety of lifting mechanisms may be employed and are employed in connection with this type of device. At any rate, sealing bar 16 is moved reciprocably up-and-down for making intermittent contact with the film which is interposed between the working surface 16A of sealing bar 16 and the peripheral surface of the sealing roll 17.

The web 10 of thermoplastic material is normally at dwell during the time that the sealing bar 16 is disposed downwardly in contact with this material to perform the welding, sealing, and severing operations, with the material 10 moving during that time interval when the sealing bar 16 is raised away from the surface of roll 17. The sealing bar 16 together with roll 17 provides a welded seam or the like along the edges of the bag body, with the weld operation also severing the leading portion of the web from the main body of the web, thereby providing individual thermoplastic film articles or products. This article fabrication operation is one which may be accomplished by a number of bag-making machines which are commercially available, such as, for example, that certain bag-making machine sold by G. T. Schjeldahl Company of Northfield, Minnesota under the code number or designation "B-308".

The conveyor mechanism for the removal of individual articles from the converting apparatus is shown generally at 22, and includes support posts such as shown at 23 and 24, along with a horizontal frame or bed 25. The conveyor includes a lower flight or run as at 26, along with an upper flight or run as at 27, more clearly illustrated in FIGS. 2 and 3. These conveyor runs may, for convenience, comprise a plurality of parallelly disposed bands of flexible webbing or the like. Conveyors of this type are, of course, commercially available and are adapted and arranged to move the individual sheet film articles in captive relationship between superimposed webs at rates of speed in excess of 200 feet per minute. The individual runs of webbing are driven as required by drive rolls 28 and 29, these drive rolls preferably being controlled by the same prime mover as motor 18. In order to bring the individual finished products into the constant speed conveyor system 22, a pick-off mechanism generally shown at 31 is utilized. This pick-off mechanism includes an arcuately reciprocating jaw or the like which is pivoted about rod member 32, a link or arm member 33 being arcuately moved about rod 32 by means of cam 34 and cam follower 35. Resilient spring member 36 retains cam follower 35 in contact with the camming surface of cam 34, cam 34 being generally fast on shaft 37 and rotating therewith. The jaw formed by pick-off mechanism 31 comprises a portion of the upper conveyor 27, such as the end terminal roll thereof, as shown at 39. The jaw mechanism of pick-off 31 is adapted to pivot upwardly and downwardly about pivot rod 32, such as is illustrated in the two dispositions of the pick-off mechanism in FIGS. 2 and 3. As is indicated in FIG. 1, shaft 37 is journaled in a suitable bearing block or member 40, which is, of course, conventional mechanical practice. It will also be appreciated that the cams 20 and 34 are driven by prime mover 18 to provide harmonic synchronism between the reciprocatory motion of sealing bar 16 and pick-off 31.

Briefly, in operation, as sealing bar 16 comes into a dwell position in contact with the surface of superimposed thermoplastic strips forming web 10, a short period of dwell is permitted in order to enable a uniform continuous weld or bond to be formed between the individual layers forming the web by means of fusion and ultimate freezing. Following the interval of dwell and initiation of raising of sealing bar 16, the pick-off mechanism 31 functions to bring the forward portion of the pick-off, such as the terminal roll 39, into contact with the lower conveyor run 26, and in this manner frictionally remove the severed completed bag from the zone between tip 16A of sealing bar 16 and surface of sealing roll 17. Since the weld formed between the superimposed films will fracture or sever along its central axis at this time, a thin weld seam is available both at the trailing edge of the finished product, and at the leading edge of the material remaining and forming the web 10. Upon lifting of the sealing bar 16, and thereafter with an additional arcuate rotation of draw rolls 14 and 15, a fresh working segment of web 10 is interposed between sealing bar 16 and sealing roll 17, and the converting system or apparatus is thereby readied for a new cycle.

Preferably, arm 42 which carries the roller 39 is longitudinally adjustable relative to rotatably journaled shaft 32 in order to properly longitudinally position and tenson the jaw of the pick-off mechanism 31. A slotted zone is illustrated as at 43 to accomplish this purpose. Since the conveyor 22 operates at a constant speed with the individual bags being formed intermittently, the rate of speed at which the conveyor moves product will necessarily exceed the average or peak rate of speed at which the draw rolls move the web of material 10. Individual bags which have passed through the conveyor are shown at 45 and 46, and represent respectively, one bag 45 which has been removed from the final working station of the converting apparatus, and a second bag 46 which is shown in free-flight and entering the product receiving station.

Figure 4:
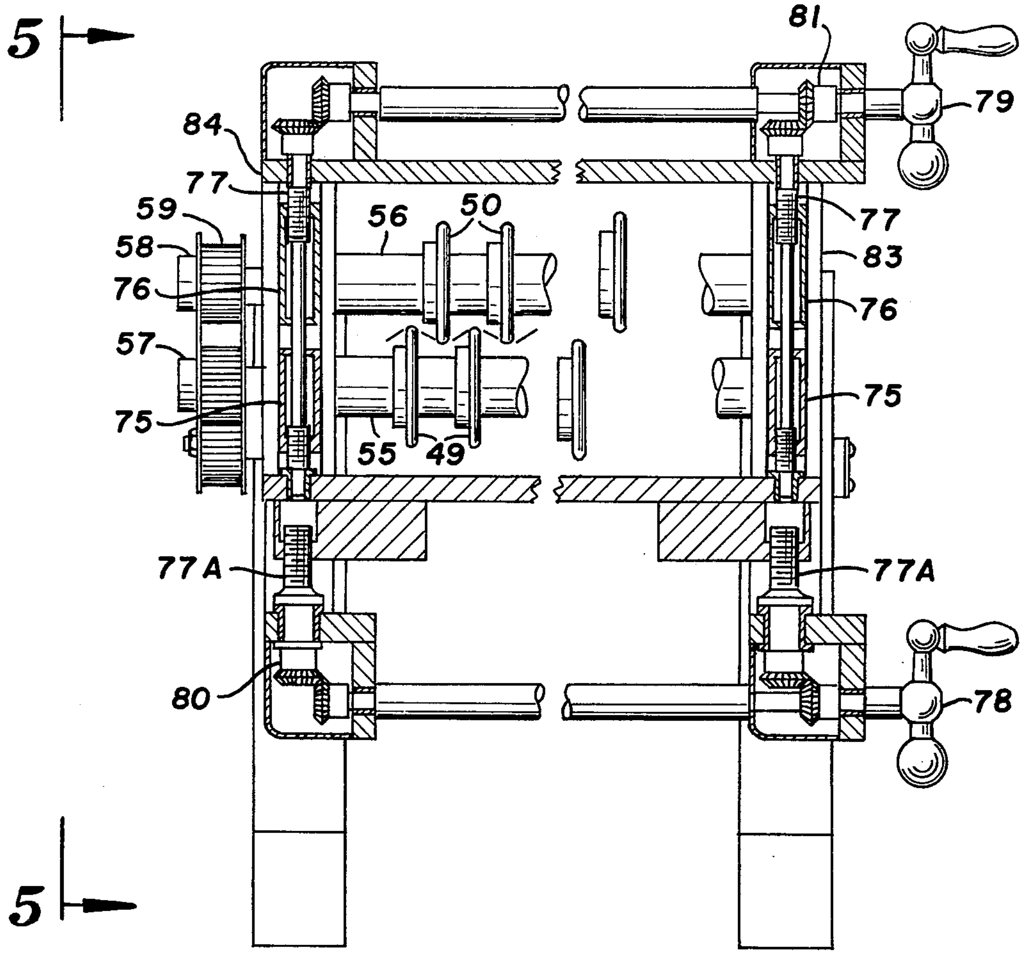
FIG. 4 is an end elevational view of the stacking or corrugating wheels and the drive means provided therefor.

As the individual thermoplastic film products or articles such as the bags 45 and 46 leave the conveyor mechanism 22, the leading edge of each bag, such as the bag 45, moves into inter-engaging relationship with the stacking or corrugating wheels shown generally at 48. The stacking or corrugating wheels 48 include a plurality of vertically and axially offset rotating wheels, such as the wheels 49—49 and 50—50, as best illustrated in FIG. 4. Depending upon the width of the product, a greater or lesser number of stacking or corrugating wheels will be provided, it being understood that a typical spacing of approximately 1½ inches (37 mm) is utilized for products comprising two layers or strips of ½ mil to 1 mil (12.7 microns to 25.4 microns) polyethylene film. Upon leaving the constant speed conveyor 22, it is normally necessary to prepare the individual thermoplastic film articles to engage in a free-flight transfer onto the stacking area, thus the inter-positioning of the axially offset interleaved corrugating wheels 49—49 and 50—50 to provide a longitudinally directed corrugated configuration in the individual sheet articles. This corrugated effect can also be defined as a generally sinusoidal transverse profile, such as is illustrated in FIG. 4 of the drawing, with article 45 being shown passing between two pairs of corrugating wheels 49—49 and 50—50.

Figure 5:
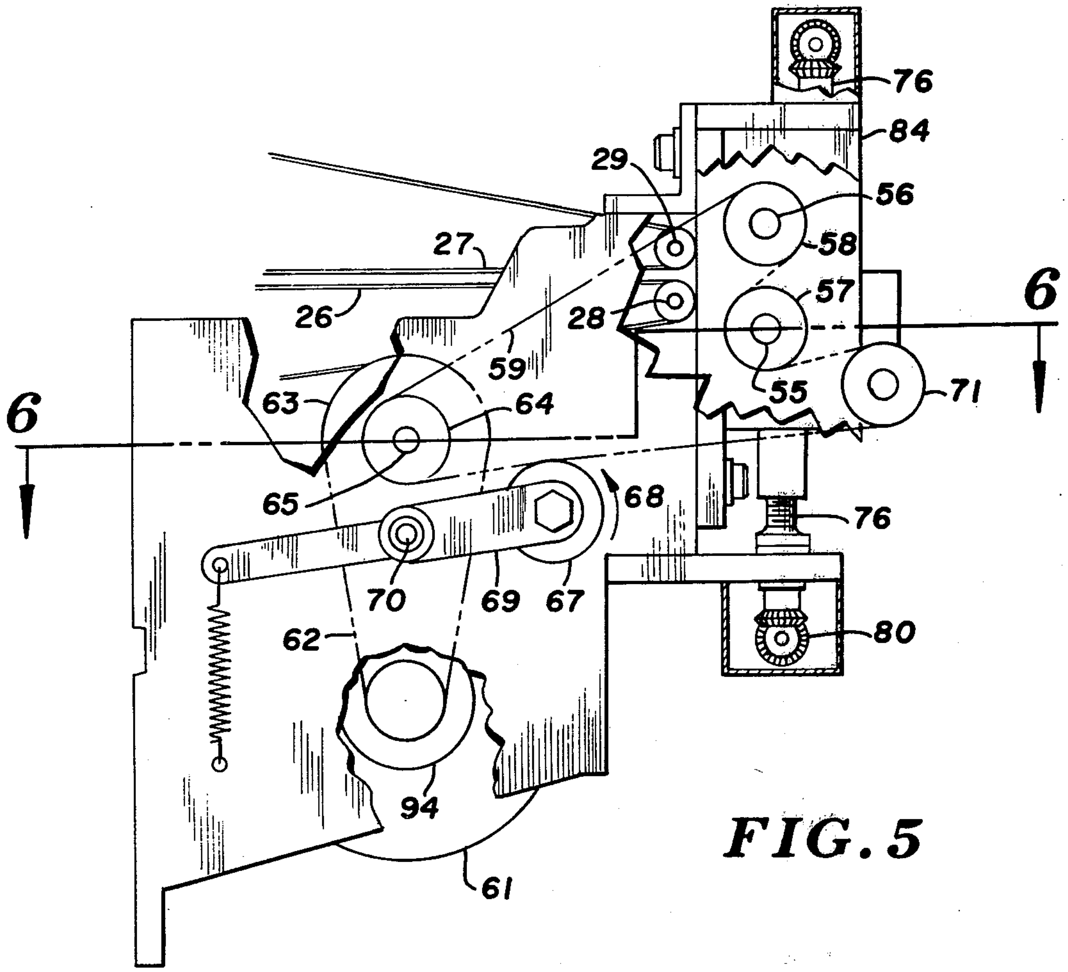
FIG. 5 is a side elevational view of the corrugating wheel mechanism, with FIG. 5 being taken along the line and in the direction of the arrows 5—5 of FIG. 4.
Figure 6:
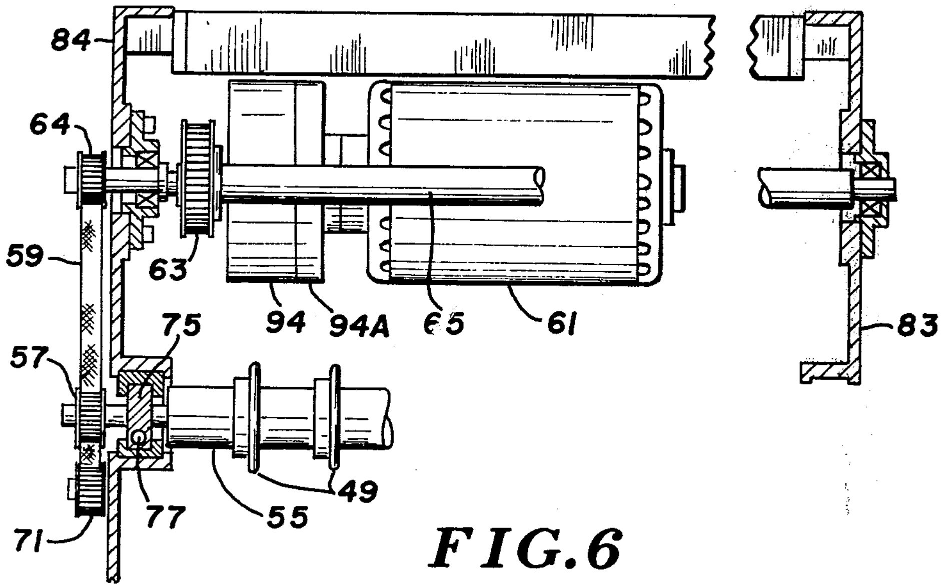
FIG. 6 is a horizontal sectional view taken along the line and in the direction of the arrows 6—6 of FIG. 5.

With continued attention being directed to FIG. 4, as well as FIGS. 5 and 6, it will be seen that the corrugating wheels are mounted upon rotating shafts 55 and 56, these shafts being driven in synchronism by two sprockets 57 and 58, respectively. In this regard, an endless belt, preferably a timing belt is provided as at 59, with the belt being appropriately coupled to a power source. It will be appreciated that power source 18 may be utilized to drive belt 59, however, alternately, a separate power source such as motor 61 may be provided as illustrated in FIG. 5, motor 61 driving through independent belt 62 onto double sprocket 63, sprocket 63 having sprocket 64 rotating therewith about shaft 65. In order to provide appropriate tension in belt 59, a dancer 67 is provided, with dancer 67 being normally biased in the direction of arrow 68, and being mounted on arm 69 for pivotal motion about shaft 70. Idler 71 is provided to complete the various spans of belt 59 and provide a workable arrangement therefor. As is apparent in FIG. 5, shafts 55 and 56 rotate in opposite directions, thereby providing cooperative motion to corrugating wheels 49—49 and 50—50 at the meeting peripheral zones thereof, the outer edge surfaces of wheels 49—49 and 50—50 frictionally engaging the film product passing therethrough.

In order to control the horizontal elevation and the depth to which the circumferences of the individual corrugating wheels 49—49 and 50—50 inter-engage, rotating shafts 55 and 56 journaled in movable blocks 75—75 and 76—76 are provided, the dispositions of which are controlled by threaded shafts 77 and 77A. Shafts 77 and 77A are rotated by handles 78 and 79 through bevel gear combinations 80 and 81. Thus, the individual blocks 75—75 and 76—76 are movably mounted through the threaded shank portion of shafts 77 and 77A to control the horizontal disposition of the upper blocks supporting shaft 56 and the lower blocks supporting shaft 55, with the lower shaft controlling the plane of the entire support base. Right and left threads on upper and lower blocks control the inter-engagement of the upper and lower wheels 50—50 and 49—49. Supporting columns 83 and 84 are utilized to firmly support the individual components of the stacking wheel assembly.

As the individual thermoplastic film articles, such as the bags 45 and 46 enter the corrugating wheels, the peripheral speed at which these wheels are moving is substantially equal to the rate of speed at which the conveyor is moving product. However, as the trailing edge of the film article moving between the stacking wheels reaches the zone of the corrugating wheels, and is in contact with the periphery thereof, a superimposed retarding action is provided on the wheels in order to frictionally decelerate the article or bag as it starts its free-flight movement as a projectile to the stacking area as at 90. This superimposed retarding action of the corrugating wheels may be either in the form of a reduction in rotational velocity, or, in the alternative, may be a period of dwell or stoppage. With the retarding motion being synchronized with the trailing edge of the individual film articles as they move between the stacking wheels, deceleration in the articles does not interfere with the stable corrugated configuration, nor does it interfere with the free-flight.

Figure 3:
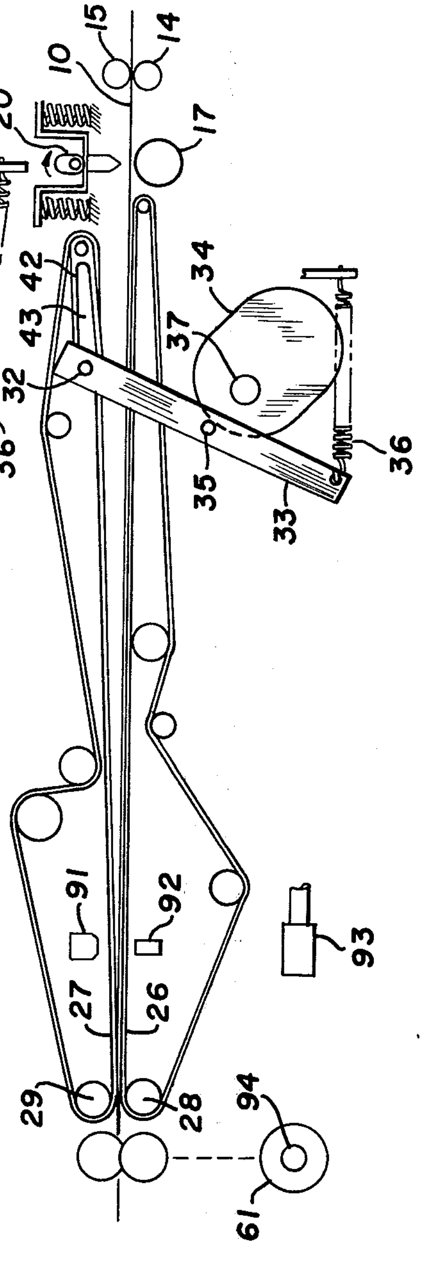
FIG. 3 is a diagrammatic view similar to that of FIG. 2, and showing the pick-off mechanism in a different stage of its operation.

Synchronization may be achieved either through the use of a common drive source, as is illustrated in FIG. 1 wherein motor 18 operates or provides power for the shafts 55 and 56, or a separate power source may be provided as illustrated in FIG. 5. When a separate power source is provided as in the embodiment of FIG. 5, a detector such as an electric lamp-photocell combination is employed as shown in FIG. 3 at 91 and 92 respectively, with the movement of a film article along the conveyor 22 and between lamp 91 and photoselectric cell 92 providing the signal which, in turn, is delivered to a clutch-brake assembly interposed between motor 61 and belt 59. Such a clutch-brake assembly may be employed in the system and provided by a signal from cell 92 controlling the operation of relay 93, relay 93, in turn, controlling the action of clutch-brake assembly 94. Clutch-brake assembly 94 is coupled to the output shaft of motor 61, thereby controlling the movement of belt 62.

As an alternative to the photoelectric cell 92, a detector such as a sonic sensing device may be employed to determine or detect the presence of product moving along conveyor 22. At any rate, it will be appreciated that when a single power source such as motor 18 is employed to energize the corrugating wheels, means may be provided for superimposing speed retarding action on these wheels which runs coincidentally with and in synchronism with the remaining operating stations in the overall assembly. If desired, an impedance means such as a potentiometer within relay 93 may be provided for varying the voltage applied to the brake portion of clutch-brake 94 so as to render it possible to controllably and periodically retard the rate of speed of the stacking wheels rather than periodically interrupt their motion.

As an alternate to the system illustrated, two drive shafts rotating at different speeds may be engaged mechanically by means of cone-clutches so as to achieve a controlled rate of speed reduction in shafts 55 and 56. Also, a set of eliptical gears may be provided, with these eliptical gears being driven from main power source or motor 18, and illustrated at 96 and 97, with gear 96 being fast on shaft 98, and gear 97 being fast on shaft 99. Shaft 98 is operatively coupled to motor 18 and thus is driven directly therefrom.

Figure 2:
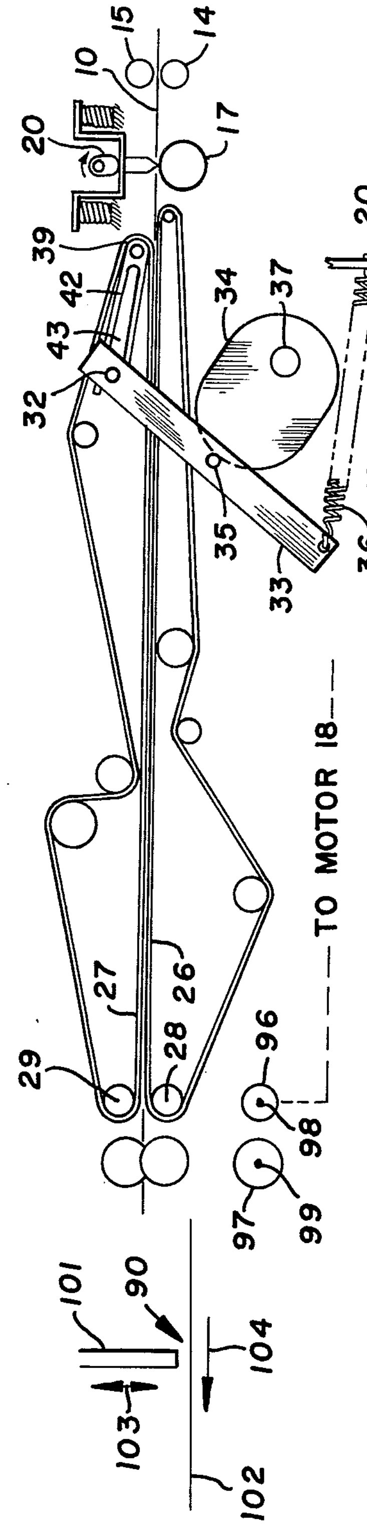
FIG. 2 is a detail diagrammatic view of the pick-off mechanism adapted to remove products from the final working station, specifically the welding, sealing and severing station and on to the constant speed conveyor, the stacking or corrugating wheels and speed attenuating station being at the downstream end of the conveyor, with the pick-off mechanism being shown in the stage of its operation wherein film product is being removed from the final working station and being transferred onto the conveyor for movement therealong.

While the present arrangement has been illustrated in connection with a stacking gate, it will be appreciated that the present invention is applicable to a wide variety of stacking arrangements, stacking stations, or the like. The stacking area or gate includes a reciprocably movable gate member 101, as illustrated in FIGS. 2 and 3, with member 101 being arranged above slowly moving or intermittently moving conveyor 102. Conveyor 102 is preferably intermittently driven and comprises an endless belt member. The individual film product articles are stacked in superimposed relationship, normally in predetermined numbers per stack, on the upper surface of member 102. Thus, after the individual articles, such as articles 45 and 46 leave the decelerating or speed attenuating corrugating wheels 49—49 and 50—50 and fall freely into the product receiving station 90, they will be retained in stacked relationship as illustrated in FIG. 1. When a predetermined number of articles have been delivered, gate 101 is elevated as shown by the double-ended arrow 103, and conveyor belt 102 is moved in the direction of arrow 104, so as to clear the accumulated stack from station 90. Thereafter, gate 101 is dropped into position, belt 102 is stopped, and the stacking of product will continue. Normally this is conducted at a relatively high rate of speed in order that normal machine operation need not be interrupted.

It will be seen that the rate of speed at which the entire bag-making or converting apparatus can be operated is increased when the film products may be delivered from the conveyor 22 at a high and predictable rate of speed. Thus, with conveyor 22 operating at a high rate of speed, the individual film products are carefully and slowly delivered from the end of the run against the stacking gate and onto an intermittently or slowly moving conveyor, where they may be ultimately delivered to a working, counting, or packing station. It will be appreciated, also, that in the event conveyor 102 is operated continuously, a shingling stacking arrangement of product may be received, and in such an event, gate 101 will normally be elevated somewhat from the surface of belt 102 to permit passage of product thereunder.

The amount of retardation to be imposed on the corrugating wheels may have a range of from zero, that is, corrugating wheel stationary, to a rate which is equal to approximately 95% of the normal speed of the wheels.

In addition to fabrication of articles from films of thermoplastic material such as polyethylene, it will be appreciated that other materials may be utilized which have sufficient thermoplastic characteristics so as to permit thermal treatment thereof. Thus, the term "thermal treating" as used herein is in a comprehensive sense, since various techniques may be employed for severing the thermoplastic web into individual film articles forming the product.

Also, the specific examples provided herein are directed toward the fabrication of side-weld plastic bags, and it will, of course, be appreciated that this is exemplary only and is not to be construed as a limit upon the applicability of the arrangement.

We claim:

1. In combination with a thermoplastic film converting machine having a working surface and a work station disposed therealong, means at the input end of said working surface for receiving a supply web of thermoplastic film to be treated, draw roll means for controllably moving said supply web from said supply to said work station, thermal treating means disposed at said work station for intermittently sealing and severing said thermoplastic web at spaced locations along the length of said web to prepare thermoplastic film products therefrom, product conveyor means for removing thermoplastic film products from said thermal treating means and conveying said products to a product receiving station, and a product receiving station disposed at the output end of said conveyor means for receiving thermoplastic film products; corrugating wheels disposed along said conveyor means between said thermal treating means and said product receiving station for transferring said thermoplastic film products from said conveyor means to said product receiving station, said corrugating wheels comprising:

a. a first and second plurality of disc means disposed in spaced relationship along respective first and second generally parallelly disposed mounting shafts, with said first and second plurality of disc means being arranged in spaced staggered relationship along said mounting shafts, each of said mounting shafts being arranged for axial rotation and having drive means for imparting controlled rotation thereto, said first mounting shaft being disposed above the plane of said product conveyor means and said second shaft being disposed below said product conveyor plane, and with the peripheral edges of said first and second plurality of disc means overlapping to present a generally sinusoidal transverse profile;

b. said drive means being arranged to impart rotary motion to said mounting shafts in timed relationship to the movement of thermoplastic film products therethrough, with said drive means normally rotating said mounting shafts to drive said disc means at a peripheral rate generally equal to the linear speed of said conveyor means, and with speed control means arranged to intermittently and momentarily retard the rotational velocity of said mounting shafts and said disc means at a point in time generally coincidential with the passage of the trailing edge of each thermoplastic film product through said disc means and to thereafter restore said normal rotational velocity upon completion of passage of each thermoplastic film product through said disc means.

2. The combination as defined in claim 1 being particulary characterized in that said speed control means is arranged to function in harmonic timed relationship with said thermal treating means.

3. The combination as defined in claim 1 being particularly characterized in that said speed control means functions in timed relationship to a photocell detector detecting the passage of thermoplastic film products along said product conveyor means at a point immediately inwardly adjacent said disc means.

4. The combination as defined in claim 1 being particularly characterized in that said retardation of the rotational velocity of said mounting shafts continues until said mounting shafts are at dwell.

* * * * *